(No Model.) 2 Sheets—Sheet 1.

J. BAIRET.
VEHICLE THILL OR POLE SUPPORT.

No. 525,308. Patented Aug. 28, 1894.

Witnesses
C. E. Ashley
H. W. Lloyd

Inventor
By his Attorney John Bairet
Charles J. Kintner (No Model.) 2 Sheets—Sheet 2.
J. BAIRET.
VEHICLE THILL OR POLE SUPPORT.
No. 525,308. Patented Aug. 28, 1894.
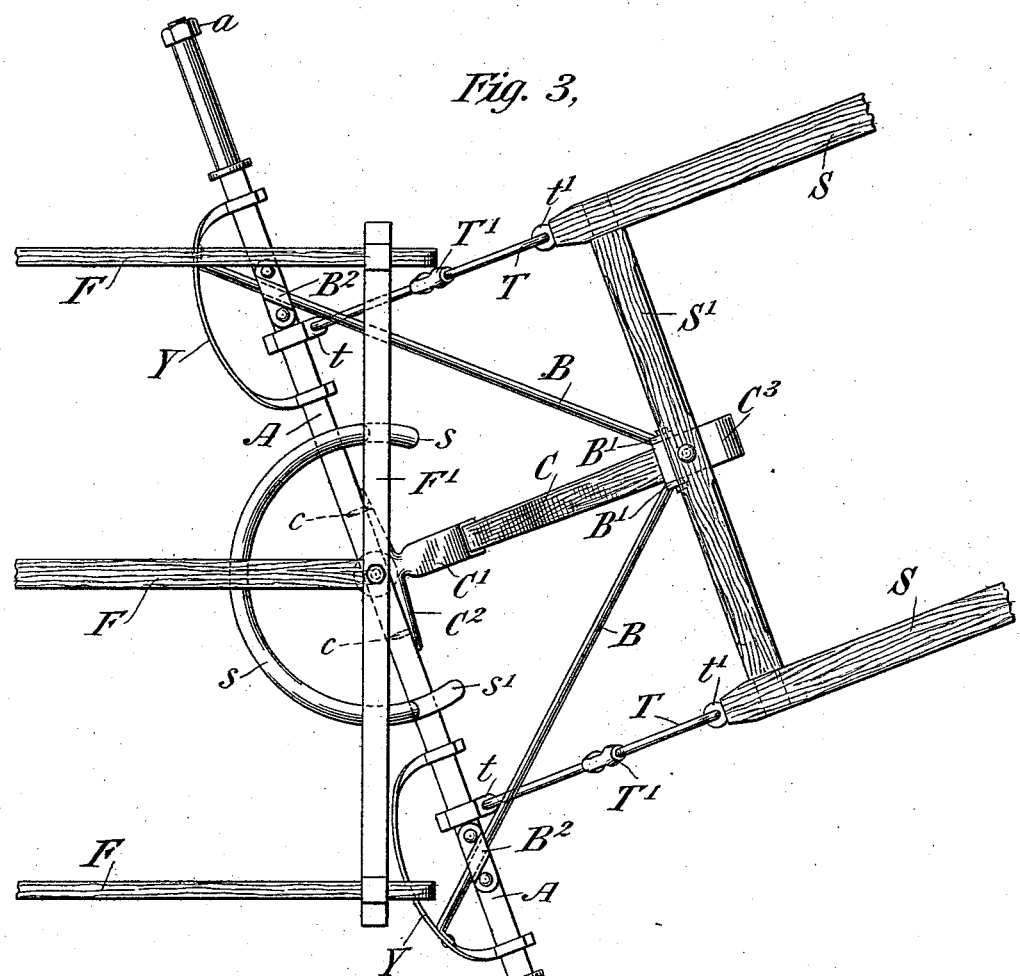
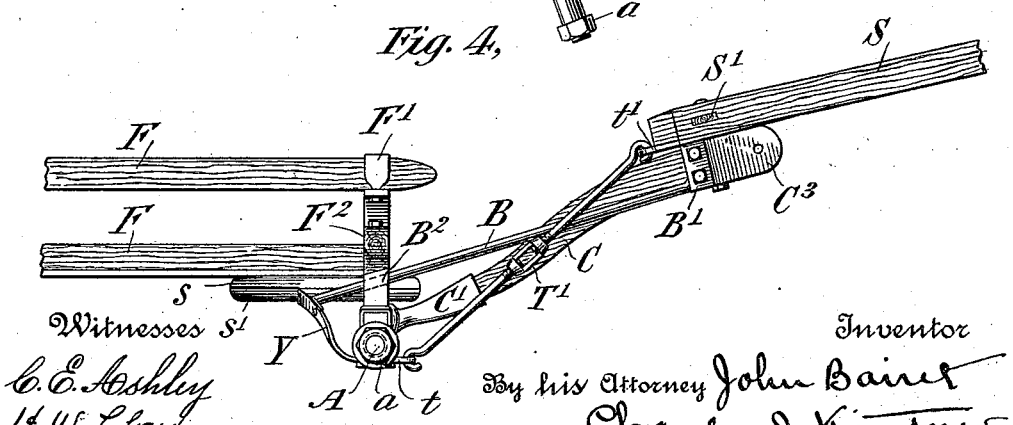
Witnesses
C. E. Ashley
H. W. Lloyd
Inventor
John Bairet
By his Attorney
Charles J. Kintner

UNITED STATES PATENT OFFICE.

JOHN BAIRET, OF EAST PORT CHESTER, CONNECTICUT, ASSIGNOR TO RICHARD L. PLACE, OF SAME PLACE.

VEHICLE THILL OR POLE SUPPORT.

SPECIFICATION forming part of Letters Patent No. 525,308, dated August 28, 1894.

Application filed January 16, 1894. Serial No. 497,014. (No model.)

*To all whom it may concern:*

Be it known that I, JOHN BAIRET, a citizen of the Republic of France, residing at East Port Chester, county of Fairfield, and State of Connecticut, have made a new and useful Invention in Apparatus for Sustaining or Supporting the Thills or Poles of Carriages, of which the following is a specification.

My invention has for its objects, first the provision of means whereby the pole or thills of a carriage may be detachably and rigidly sustained to the front axle of the vehicle in such manner that when the carriage or vehicle is housed the pole or thills may be separately stored; second to give increased strength to the attachment of poles or thills and the running gear of a carriage or vehicle and in such manner that the draft of the horses will be equally distributed through the bracing action of the entire structure.

My invention will be fully understood by referring to the accompanying drawings, in which—

Figure 1:
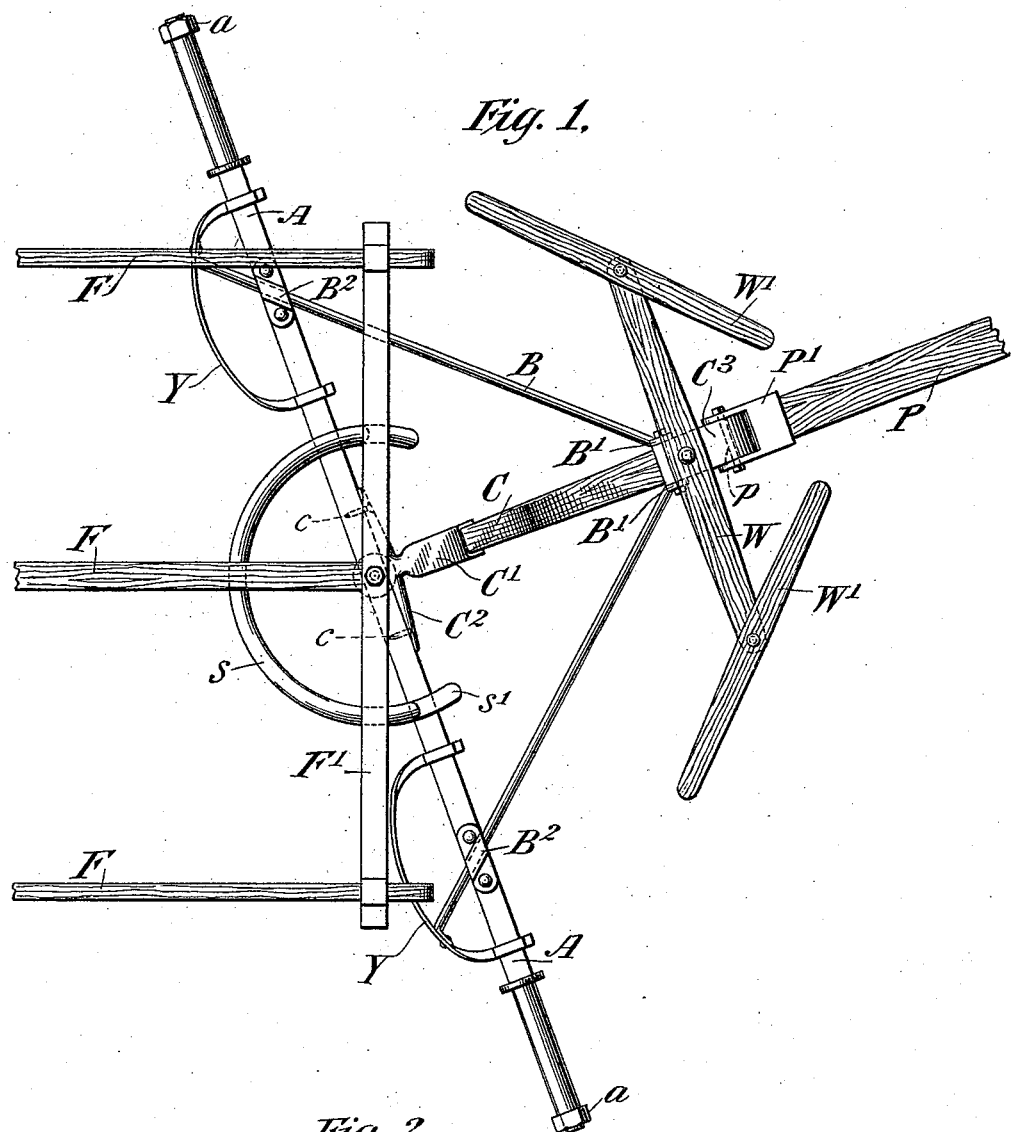
Figure 2:
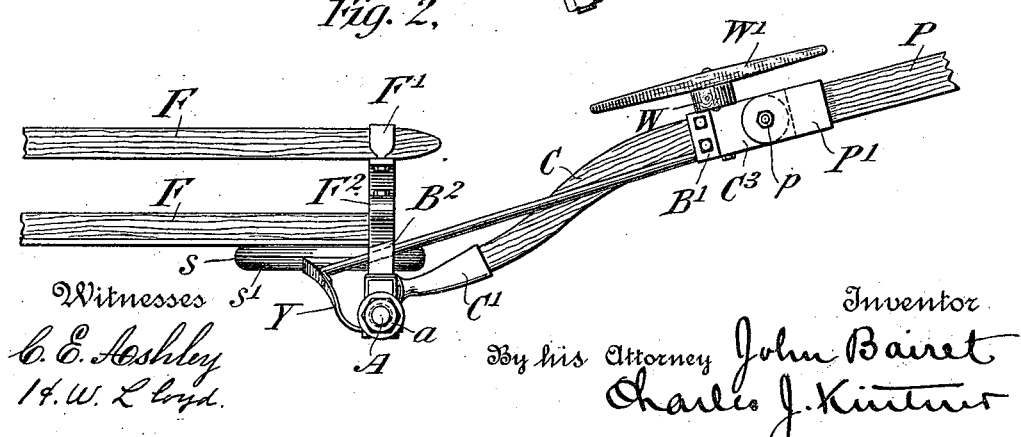

Figure 1 is a plan view of the front axle, the side bars and fifth wheel of a carriage with my improvement for use in connection with a carriage pole attached thereto. Fig. 2 is a side elevational view of the same parts illustrated in Fig. 1. Fig. 3 is a plan view of the same parts as applied to a one horse vehicle in which thills replace the pole shown in Figs. 1 and 2. Fig. 4 is a side elevational view of the parts shown in Fig. 3 and bears the same relation to that figure as Fig. 2 does to Fig. 1.

Referring now to the drawings in detail in all of which like letters of reference represent like parts wherever used and first to Figs. 1 and 2. A is the axle of an ordinary vehicle provided with the usual wheel bearing spindles having wheel retaining nuts $a\ a$.

F F F are the usual side bars which support the body of the vehicle and are attached in a well known manner to a horizontal cross bar F' which is pivotally supported at the center of the axle upon springs $F^2$, $s\ s'$ being the usual fifth wheel and $F^3$ the center pole or reach of the vehicle.

C' is a metal socket secured to the axle A by bolts or clips $c\ c$, and $C^3$ is a similar metal socket which acts as a support for the outer end of a short stationary bracing portion C for the carriage pole, said outer socket being secured to the sectional part C by bolts which run through both parts, and one of which bolts B' secures also the outer ends of a pair of stiff sustaining rods B B, which rods in turn are secured at their inner ends each to a yoke or brace Y bolted to the axle A in any preferred manner.

$B^2\ B^2$ are metal plates which are located above the axle and act as guides and fulcra for the sustaining rods B although these plates may be, if preferred, located on the lower side of the axle.

W, W' W' represent the whiffle-trees secured by a bolt to the upper side of the socket $C^3$.

P represents the carriage pole, the inner end of which is secured in a socket P' which socket is pivotally attached to the socket $C^3$ by a bolt $p$ so that when in use the outer end of the pole only is supported upon the horses' necks, the joint or pivot between the two sockets $C^3$ and P' permitting of freedom of vertical motion to such an extent that when not in use the free end of the pole will rest upon the floor or ground. It will be observed that this structure is of such a nature that the entire weight of the whiffle-trees W, W' W' and the inner end of the pole P and sockets P' and $C^3$ is supported at the outer end of the rigid bars B B which act as fulcra upon the bearing plates $B^2\ B^2$ carried by the axle A while the strains are transmitted to the yokes Y Y. At the same time the short sectional portion C acts as a brace so that the strains are transmitted back from the socket $C^3$ to the socket C', these parts also acting conjointly with the pole to receive the backward thrust due to the weight of the vehicle put upon the pole when traveling down grade. It is therefore perceptible that the entire structure is in the nature of a truss which distributes, equally, the strains to the best advantage to the different parts of the axle A and at the same time supports the whiffle-trees and the pole in such manner that both of these parts may be wholly detached, if preferred, when it is stored in the carriage house.

The modified form shown in Figs. 3 and 4 illustrates the application of my invention in connection with thills. In this instance S S represent the thills secured by a cross bar S' to a socket C³ which may be the same socket as was described in connection with Fig. 1.

T T represent draft bolts made in two parts united together by swivel joints T' T'. The opposite ends of these draft bolts are secured by clips $t\,t$ and eyes $t'\,t'$ to the shaft A and the inner ends of the thills S. It will therefore be seen that the structure is such that the bars B B, sockets C' C³, yokes Y Y and the short stationary bracing portion C are adapted for use for either a pole or thills at the pleasure of the user.

I do not limit myself to the special structures herein shown and described. I believe it is broadly new with me to provide means in the nature of a self-supported truss carried by the axle of the vehicle which will sustain detachably the pole or thills thereof and give the entire structure great strength and durability.

Having thus described my invention, what I claim, and desire to secure by Letters Patent of the United States, is—

1. A pole or thill supporting device consisting of a thrust bar or brace secured to the front axle of a vehicle for taking the rear thrust of the pole, and supporting bars secured at their front ends to the thrust bar and resting upon the axle of the vehicle near their rear ends, in combination with yokes or braces attached to the rear ends of said supporting bars and the axle of the vehicle, substantially as described.

2. A pole or thill supporting device consisting of a pair of sustaining bars fulcrumed upon the axle of a vehicle near their rear ends, a pole supporting socket carried and supported by said bars at their front ends, and sustaining yokes or braces secured to the axle of the vehicle and connected to the rear ends of the supporting bars, substantially as described.

3. A pole or thill supporting device comprising a pair of supports fulcrumed upon the axle of a vehicle and secured at their opposite ends to yokes or braces and to a pole socket, in combination with a second socket secured to the axle of the vehicle, and a sectional thrusting part secured to both sockets, substantially as described.

4. A thill supporting device comprising a pair of supporting bars fulcrumed upon the axle of a vehicle and attached at their opposite ends to yokes or braces, and a socket, in combination with a second socket attached to the axle of the vehicle, a sectional stationary portion secured to both sockets, and a pair of thills secured to the first named socket and to the axle of the vehicle by draw bolts and swivels, substantially as described.

5. A pole or thill supporting device comprising a pair of supporting bars fulcrumed upon the axle of a vehicle, yokes or braces attached also to the axle, and supporting the rear ends of the bars, in combination with a central thrust bar or brace secured at its rear end to the axle and connected to and supported at its front end by the outer end of said bars, substantially as described.

In testimony whereof I have hereunto subscribed my name this 15th day of January, 1894.

JOHN BAIRET.

Witnesses:
C. J. KINTNER,
M. M. ROBINSON.